United States Patent
Primor

(10) Patent No.: US 12,433,830 B2
(45) Date of Patent: Oct. 7, 2025

(54) ANTI-AGING COMPOSITIONS AND METHODS OF USE THEREOF

(71) Applicant: S.I.S. SHULOV INNOVATIVE SCIENCE LTD., Rehovot (IL)

(72) Inventor: Naftali Primor, Jerusalem (IL)

(73) Assignee: S.I.S. SHULOV INNOVATIVE SCIENCE LTD., Rehovot (IL)

( * ) Notice: Subject to any disclaimer, the term of this patent is extended or adjusted under 35 U.S.C. 154(b) by 722 days.

(21) Appl. No.: 17/762,817

(22) PCT Filed: Sep. 23, 2020

(86) PCT No.: PCT/IL2020/051034
§ 371 (c)(1),
(2) Date: Mar. 23, 2022

(87) PCT Pub. No.: WO2021/059266
PCT Pub. Date: Apr. 1, 2021

(65) Prior Publication Data
US 2022/0401336 A1 Dec. 22, 2022

Related U.S. Application Data

(60) Provisional application No. 62/906,104, filed on Sep. 26, 2019.

(51) Int. Cl.
| | | |
|---|---|---|
| *A61K 38/07* | (2006.01) | |
| *A61K 8/64* | (2006.01) | |
| *A61P 17/18* | (2006.01) | |
| *A61Q 19/02* | (2006.01) | |
| *A61Q 19/08* | (2006.01) | |
| *C07K 5/10* | (2006.01) | |

(52) U.S. Cl.
CPC ............... *A61K 8/64* (2013.01); *A61Q 19/08* (2013.01)

(58) Field of Classification Search
CPC .......... A61K 38/07; A61K 8/64; A61P 17/18; C07K 5/10; C07K 5/1024; A61Q 19/02; A61Q 19/08
See application file for complete search history.

(56) References Cited

U.S. PATENT DOCUMENTS

| | | | |
|---|---|---|---|
| 4,100,274 A | 7/1978 | Dutta | |
| 4,619,916 A | 10/1986 | Di Stazio | |
| 7,220,725 B2 | 5/2007 | Shulov | |
| 8,017,581 B1 | 9/2011 | Martinez | |
| 9,012,397 B2 | 4/2015 | Primor | |
| 11,419,913 B2 * | 8/2022 | Primor | A61P 27/02 |

FOREIGN PATENT DOCUMENTS

| | | | |
|---|---|---|---|
| CA | 3094295 A1 | 10/2019 | |
| WO | 0212269 A2 | 2/2002 | |
| WO | 2012131676 A1 | 10/2012 | |
| WO | 2019186561 A1 | 10/2019 | |

OTHER PUBLICATIONS

Wrinkles from Cleveland Clinic, pp. 1-15, Accessed Feb. 12, 2025. (Year: 2025).*
Rudinger J, "Characteristics of the amino acids as components of a peptide hormone sequence," Peptide Hormones, JA Parsons Edition, University Park Press, Jun. 1976, pp. 1-7. (Year: 1976).*
"Designing Custom Peptides," from SIGMA Genosys, pp. 1-2. Accessed Dec. 16, 2004. (Year: 2004).*
Berendsen HJC, "A Glimpse of the Holy Grail?" Science, 1998, 282: 642-643. (Year: 1998).*
Voet D, Voet JG, Biochemistry, Second Edition, John Wiley & Sons, Inc., 1995, pp. 235-241. (Year: 1995).*
Ngo JT, Marks J, Karplus M, "Computational Complexity, Protein Structure Prediction, and the Levinthal Paradox," The Protein Folding Problem and Tertiary Structure Prediction, K. Merc Jr. and S. Le Grand Edition, 1994, pp. 491-495. (Year: 1994).*
Bradley CM, Barrick D, "Limits of Cooperativity in a Structurally Modular Protein: Response of the Notch Ankyrin Domain to Analogous Alanine Substitutions in Each Repeat," J. Mol. Biol., 2002, 324: 373-386. (Year: 2002).*
Yampolsky et al., "The Exchangeability of Amino Acids in Proteins," Genetics, 2005, 170: 1459-1472. (Year: 2005).*
Bos and Meinardi (2000) The 500 Dalton rule for the skin penetration of chemical compounds and drugs. Exp Dermatol 9(3): 165-169.
Gaynes et al., (2013) Efficacy of a novel synthetic topical tetrapeptide on eliciting analgesia subsequent to experimentally induced chemical corneal injury. ARVO Annual Meeting Abstract. Investigative Ophthalmology & Visual Science 54(15): E-Abstract 5416.
Larrañeta et al., (2016) Microneedle arrays as transdermal and intradermal drug delivery systems: Materials science, manufacture and commercial development. Materials Science and Engineering: R: Reports 104: 1-32.
Nakamura et al., (2018) Alternative test models for skin ageing research. Exp Dermatol 27(5): 495-500.
Nickoloff et al., (1988) Additive and synergistic antiproliferative effects of cyclosporin A and gamma interferon on cultured human keratinocytes. Am J Pathol 131(1): 12-18.
Ockenfels et al., (1995) Cyclosporin A, FK506 and dithranol after tyrosine-specific protein phosphorylation in HaCaT keratinocytes. Arch Dermatol Res 287(3-4): 304-309.
Osborne et al., (2005) Use of human skin equivalent cultures for cosmetic benefit screening. Journal of the American Academy of Dermatology; Poster Discussion Session 495—Pediatrics 52(3): Supplement, P96, abstract P1051. Presented at the American Academy of Dermatology 63rd Annual Meeting. Feb. 18-22, 2005; New Orleans, LA, USA.

(Continued)

*Primary Examiner* — Julie Ha
(74) *Attorney, Agent, or Firm* — Allan A. Fanucci

(57) ABSTRACT

Compositions comprising specific tetrapeptides, for use in treating, preventing, minimizing, diminishing or reversing various signs of aging of the skin are provided. The compositions are useful in improving the firmness or elasticity of skin, smoothing of fine-lines or wrinkles, reducing skin pores and hyperpigmentation, and increasing skin thickness, radiance and/or softness.

11 Claims, No Drawings

Specification includes a Sequence Listing.

(56) References Cited

OTHER PUBLICATIONS

Paramio and Jorcano (1997) Role of protein kinases in the in vitro differentiation of human epidermal HaCaT cells. Br J Dermatol 137(1): 44-50.
Pillai et al., (2005) Ultraviolet radiation and skin aging: roles of reactive oxygen species, inflammation and protease activation, and strategies for prevention of inflammation-induced matrix degradation—a review. Int J Cosmet Sci 27(1): 17-34.
Pinnagoda et al., (1990) Guidelines for transepidermal water loss (TEWL) measurement. A report from the Standardization Group of the European Society of Contact Dermatitis. Contact Dermatitis 22(3): 164-178.
Sun and Green (1976) Differentiation of the epidermal keratinocyte in cell culture: formation of the cornified envelope. Cell 9(4 Pt 1): 511-521.
Stetler-Stevenson et al., (1981) An approach to the elucidation of metabolic breakdown products of the luteinizing hormone-releasing hormone. J Med Chem 24(6): 688-692.

\* cited by examiner

SEQUENCE LISTING

```
<160> NUMBER OF SEQ ID NOS: 2

<210> SEQ ID NO 1
<211> LENGTH: 4
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: pyroglutamic acid (pGlu)
<220> FEATURE:
<221> NAME/KEY: MOD_RES
<222> LOCATION: (4)..(4)
<223> OTHER INFORMATION: C8 alkyl attached to the epsilon amine of the
      Lysine side chain to form Lys(Octanoyl)

<400> SEQUENCE: 1

Glu Asn Trp Lys
1

<210> SEQ ID NO 2
<211> LENGTH: 4
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: pyroglutamic acid (pGlu)

<400> SEQUENCE: 2

Glu Asn Trp Thr
1
```

ANTI-AGING COMPOSITIONS AND METHODS OF USE THEREOF

SEQUENCE LISTING

The Sequence Listing submitted herewith is an ASCII text file (2022 Mar. 23_Sequence_Listing.txt, created on Mar. 22, 2022, 913 bytes), is filed via EFS-Web, and is hereby incorporated by reference.

FIELD OF THE INVENTION

The present invention relates to compositions useful for effecting an improvement in skin appearance and texture, and methods of use thereof. In particular, the compositions are useful in treating, preventing, minimizing, diminishing or reversing various signs of aging of the skin.

BACKGROUND OF THE INVENTION

Skin aging is characterized by features such as wrinkling, loss in volume and elasticity, increase in fragility and pigmentation. Although it is a natural phenomenon that occurs with age, there are clinically proven environmental factors that contribute to skin aging including exposure to the sun and various toxins. The most common treatments for skin aging include over-the-counter topical creams and moisturizers. These generally contain fatty acids and alcohols, various vitamins and vitamin derivatives, fillers such as collagen and hyaluronic acid, and plant extracts.

U.S. Pat. No. 4,619,916 describes thirteen tripeptides made from L-amino acids corresponding to the formula p-GLU-X-TRP where X is a specific amino acid different from p-GLU and Trp, as well as a process for their preparation, pharmaceutical formulations containing them and use thereof as hypotensive and analgesic agents. The tripeptides were designed for systemic administration.

U.S. Pat. No. 7,220,725 and WO 2002/012269 describe novel peptides including pGlu-Asn-Trp-Lys(Octanoyl)-OH (ZEP3) and pGlu-Asn-Trp-Thr-OH (ZEP4) and pharmaceutical compositions comprising an analgesic effective amount of a peptide for topical administration in the treatment of pain.

U.S. Pat. No. 9,012,397 and WO 2012/131676 describe topical pharmaceutical compositions including the peptides ZEP3 or ZEP4 and use thereof for treating a skin disorder selected from the group consisting of Herpes viral infection, Varicella viral infection, rash, insect bites, jellyfish stings, burns, psoriasis, itching, skin allergic response, skin lesions as a result of drug or medical treatment side effects or complications, and hypopigmentation.

Gaynes et al. (Invest. Ophthalmol. Vis. Sci. 54, E-Abstract 5416, 2013) describe an analgesic effect of the peptide ZEP4 in reducing ocular pain and modifying pathways of nociception in a rat model of experimentally induced chemical corneal injury.

WO 2019/186561 describes pharmaceutical compositions comprising specific tetrapeptides for use in reducing the release or inhibiting the activity of inflammatory cytokines and mediators and treatment of diseases and disorders associated therewith.

There remains a yet unmet need for compositions and methods useful in treating the symptoms associated with natural or premature aging.

SUMMARY OF THE INVENTION

The present invention provides compositions useful for treating, preventing, minimizing, diminishing or reversing an epidermal condition related to aging. Within the scope of the present invention is an improvement in at least one of firmness or elasticity of the skin, smoothing of fine-lines or wrinkles, reducing skin pores, reducing hyperpigmentation, and increasing skin thickness, radiance and/or softness.

The present invention is based, in part, on the unexpected finding that peptides denoted ZEP3 and ZEP4 or salts thereof attenuate the formation of reactive oxygen species (ROS) and increase viability of epidermal cells under stress conditions.

According to one aspect of the present invention, there is provided a composition comprising as an active ingredient a peptide of Formula I: pGlu-$X_1$-$X_2$-$X_3$—OH, wherein $X_1$ is a polar amino acid residue; $X_2$ is an aromatic or hydrophobic amino acid residue; and $X_3$ is a positively charged or a polar amino acid residue, or a salt or derivative thereof; and a dermatologically acceptable carrier, for use in treating, preventing, minimizing, diminishing or reversing an epidermal condition related to aging.

According to another aspect of the present invention, there is provided a method of treating, preventing, minimizing, diminishing or reversing an epidermal condition related to aging in a subject in need thereof, the method comprising administering to the subject a composition comprising as an active ingredient a peptide of Formula I: pGlu-$X_1$-$X_2$-$X_3$—OH, wherein $X_1$ is a polar amino acid residue; $X_2$ is an aromatic or hydrophobic amino acid residue; and $X_3$ is a positively charged or a polar amino acid residue, or a salt or derivative thereof; and a dermatologically acceptable carrier.

According to some embodiments, $X_1$ is selected from the group consisting of Asn, Gln, His, Ser, Thr, Tyr, and Cys; $X_2$ is selected from the group consisting of Trp, Phe, Tyr, Ala, Ile, Leu, Met, Val, and Gly; and $X_3$ is selected from the group consisting of Lys, Lys derivative, Arg, His, Asn, Gln, Ser, Thr, and Tyr. Each possibility represents a separate embodiment.

According to other embodiments, $X_1$ is selected from the group consisting of Asn and Thr; $X_2$ is selected from the group consisting of Trp, Phe and Tyr; and $X_3$ is selected from the group consisting of Lys, Lys derivative, and Thr. Each possibility represents a separate embodiment.

According to various embodiments, the peptide derivative comprises a peptide of Formula I having an alkyl group attached to a free functional group of the peptide sequence.

According to yet other embodiments, the alkyl group is attached by an amide bond or linkage to a free amino group of a side chain or the N-terminus of the peptide.

According to some embodiments, the alkyl is a $C_4$-$C_{30}$ alkyl.

According to specific embodiments, a $C_8$ alkyl (herein octanoyl), is attached by an amide linkage to a terminal amino group of the peptide or the side chain of a Lys residue of the peptide sequence. In accordance with the latter embodiments, the Lys derivative is Lys(Octanoyl).

According to some embodiments, the C-terminus of the peptide is modified, to form an amide, alcohol or ester terminus. Each possibility represents a separate embodiment.

According to certain embodiments, the peptide of Formula I or a salt or derivative thereof is selected from the group consisting of pGlu-Asn-Trp-Lys(Octanoyl)-OH (SEQ ID NO: 1), pGlu-Asn-Trp-Thr-OH (SEQ ID NO: 2), and salts thereof.

According to some embodiments, the peptide of Formula I or a salt or derivative thereof has an amino acid sequence as set forth in SEQ ID NO: 1 or a salt thereof.

According to other embodiments, the peptide of Formula I or a salt or derivative thereof has an amino acid sequence as set forth in SEQ ID NO: 2 or a salt thereof.

According to various embodiments, the composition comprises a sodium salt of a peptide of Formula I or a derivative thereof having a sequence as set forth in any one of SEQ ID NO: 1 and SEQ ID NO: 2. Each possibility represents a separate embodiment.

According to certain embodiments, the composition comprises from about 0.1% to about 5% w/w of the peptide of Formula I or a salt or derivative thereof including each value within the specified range. According to particular embodiments, the composition comprises from about 0.5% to about 2% w/w of the peptide of Formula I or a salt or derivative thereof including each value within the specified range.

In some embodiment, the composition is formulated for topical or intradermal administration.

In other embodiments, the composition is in a form selected from the group consisting of an oil, a gel, a stick, a lotion, a cream, a milk, an aerosol, a spray, a foam, a mousse, an ointment, liquid drops, nebulized liquid, a liquid wash, an emulsion, a suspension, liposomes, an adhesive patch, and a powder. Each possibility represents a separate embodiment. In exemplary embodiments, the composition is in a form of a gel, an ointment, a cream or an emulsion. In one embodiment, the composition is in a form of an emulgel.

In particular embodiments, the dermatologically acceptable carrier comprises at least one of a thickener, a filler, a moisturizer, an emulsifier, a humectant, a surfactant, a buffering or pH adjusting agent, a film forming agent, a foaming agent, an anti-foaming agent, a preservative, an anti-oxidant, a fragrance, a solvent, a propellant, a colorant, and a combination or mixture thereof. Each possibility represents a separate embodiment.

According to certain embodiments, the epidermal condition related to aging is selected from the group consisting of elastosis, atrophy of the skin, fine lines, wrinkles, enlarged pores, hyperpigmentation, sagging skin, rough skin, and dry skin. Each possibility represents a separate embodiment.

In additional embodiments, the epidermal condition related to aging is selected from the group consisting of elastosis, atrophy of the skin, fine lines, wrinkles, enlarged pores, sagging skin, rough skin, and dry skin. Each possibility represents a separate embodiment.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DETAILED DESCRIPTION OF THE INVENTION

The present invention, relates to compositions comprising specific peptides and salts or derivatives thereof, useful in treating, preventing, minimizing, diminishing or reversing an epidermal condition related to aging.

The principles and operation of the present invention may be better understood with reference to the accompanying descriptions. Before explaining at least one embodiment of the invention in detail, it is to be understood that the invention is not necessarily limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

The present invention is based, in part, on the surprising discovery that the peptides ZEP3 and ZEP4, and their sodium salt forms, reduced the formation of reactive oxygen species (ROS) and increased viability of epidermal cells under stress conditions (70 mM NaCl). Reactive oxygen species (ROS) can cause major damage to cells by oxidizing lipids, proteins, carbohydrates and DNA in cells and tissues. This undesirable oxidation results in membrane damage, protein modification, and DNA impairment that can give rise to death of cells and tissues. Reducing the formation of ROS and increasing viability of epidermal cells under stress conditions using the peptides of the present invention indicate that the peptides claimed herein provide beneficial cosmetic effect in affording at least one of the following attributes: improving the firmness or elasticity of skin, smoothing of fine-lines or wrinkles, reducing skin pores, reducing hyperpigmentation, increasing skin thickness, radiance and/or softness, and reducing dry skin. Each possibility represents a separate embodiment.

According to certain aspects and embodiments, there is provided a composition comprising as an active ingredient a peptide of Formula I or a salt or derivative thereof and a dermatologically acceptable carrier, for use in treating, preventing, minimizing, diminishing or reversing an epidermal condition related to aging. According to other aspects and embodiments, there is provided a method of treating, preventing, minimizing, diminishing or reversing an epidermal condition related to aging in a subject in need thereof, the method comprising administering to the subject a composition comprising as an active ingredient a peptide of Formula I or a salt or derivative thereof; and a dermatologically acceptable carrier. According to additional aspects and embodiments, there is provided the use of a peptide of Formula I or a salt or derivative thereof and a dermatologically acceptable carrier for the preparation of a composition for treating, preventing, minimizing, diminishing or reversing an epidermal condition related to aging in a subject in need thereof.

According to various aspects and embodiments, the peptide of Formula I is represented by the following structure pGlu-$X_1$-$X_2$—$X_3$—OH, wherein pGlu is pyroglutamic acid; $X_1$ is a polar amino acid residue; $X_2$ is an aromatic or hydrophobic amino acid residue; and $X_3$ is a positively charged amino acid residue or a polar amino acid residue. It is to be understood that the —OH in Formula I indicates a native carboxy terminus.

As used herein, the term "a polar amino acid residue" refers to the following amino acids: Asparagine (Asn; N), Glutamine (Gln; Q), Histidine (His; H), Serine (Ser; S), Threonine (Thr; T), Tyrosine (Tyr; Y), and Cysteine (Cys; C). Each possibility represents a separate embodiment.

As used herein, the term "an aromatic amino acid residue" refers to the following amino acids: Tryptophan (Trp; W), and Tyrosine (Tyr; Y). Each possibility represents a separate embodiment.

As used herein, the term "a hydrophobic amino acid residue" refers to the following amino acids: Alanine (Ala; A), Isoleucine (Ile; I), Leucine (Leu; L), Methionine (Met; M), Phenylalanine (Phe; F), Valine (Val; V), and Glycine (Gly; G). Each possibility represents a separate embodiment.

As used herein, the term "a positively charged amino acid residue" refers to the following amino acids: Lysine (Lys; K) and a derivative thereof, Arginine (Arg; R), and Histidine (His; H). Each possibility represents a separate embodiment.

It is contemplated that the amino acid residues of the present invention include both D- and L-amino acids, preferably L-amino acids.

In further embodiments of the present invention, $X_1$ is selected from the group consisting of Asn and Thr. Each possibility represents a separate embodiment.

In other embodiments of the present invention, $X_2$ is selected from the group consisting of Trp, Phe, and Tyr. Each possibility represents a separate embodiment.

In yet other embodiments of the present invention, $X_3$ is selected from the group consisting of Lys, Lys derivative, and Thr. Each possibility represents a separate embodiment.

In further embodiments of the present invention, $X_1$ is selected from the group consisting of Asn and Thr; $X_2$ is selected from the group consisting of Trp, Phe, and Tyr; and $X_3$ is selected from the group consisting of Lys, Lys derivative, and Thr. Each possibility represents a separate embodiment.

Also included within the scope of the present invention are salts and derivatives of the peptides used in the disclosed compositions and methods.

As used herein, the term "salts" refers to salts of carboxyl groups also termed base addition salts and to acid addition salts of amino or guanidino groups of the peptide molecule. Suitable base addition salts include, but are not limited to, metallic salts of sodium, calcium, lithium, magnesium, potassium, aluminum, ferric and zinc; ammonium salts derived from ammonia, primary, secondary, tertiary and quaternary amines, non-limiting examples of which are trimethylamine, cyclohexylamine, benzylamine, dibenzylamine, 2-hydroxyethylamine, bis(2-hydroxyethyl)amine, phenylethylbenzylamine, dibenzylethylenediamine, procaine, chloroprocaine, piperidine, monoethanolamine, triethanolamine, quinine, choline, and N-methylglucosamine. Each possibility represents a separate embodiment. Salts with amino acids such as glycine, ornithine, histidine, phenylglycine, lysine, and arginine are contemplated. Each possibility represents a separate embodiment. Furthermore, any zwitterionic salts formed by a carboxylic acid and an amino or guanidine groups of the peptide molecule are contemplated as well.

Suitable acid addition salts include salts derived from inorganic acids such as, but not limited to, hydrochloric, nitric, phosphoric, sulfuric, hydrobromic, hydriodic, phosphorous, and the like, as well as salts derived from organic acids such as aliphatic mono- and dicarboxylic acids including acetic acid or oxalic acid, phenyl-substituted alkanoic acids, hydroxy alkanoic acids, alkanedioic acids, aromatic acids, aliphatic and aromatic sulfonic acids and the like. Each possibility represents a separate embodiment. The salts thus include sulfate, pyrosulfate, bisulfate, sulfite, bisulfite, nitrate, phosphate, monohydrogenphosphate, dihydrogenphosphate, metaphosphate, pyrophosphate, chloride, bromide, iodide, acetate, propionate, caprylate, isobutyrate, oxalate, malonate, succinate, suberate, sebacate, fumarate, maleate, mandelate, benzoate, chlorobenzoate, methylbenzoate, dinitrobenzoate, phthalate, benzenesulfonate, toluenesulfonate, phenylacetate, citrate, lactate, maleate, tartrate, methanesulfonate, and the like. Each possibility represents a separate embodiment. Also contemplated are salts of amino acids such as arginate and the like and gluconate or galacturonate. Each possibility represents a separate embodiment.

The acid addition salts may be prepared by known methods of the art in which the free base form is brought into contact with a sufficient amount of the desired acid to produce the salt. The base addition salts are prepared by known methods of the art in which the free acid form is brought into contact with a sufficient amount of the desired base to produce the salt.

"Derivatives" of the peptides of the invention as used herein cover derivatives which may be prepared from the functional groups which occur as side chains on the residues or the N- or C-terminal groups, by means known in the art, and are included in the invention provided that they do not adversely affect the benefits of the peptide and do not confer toxic properties to compositions containing it.

These derivatives may include, for example, aliphatic esters of the carboxyl groups, amides of the carboxyl groups produced by reaction with ammonia or with primary or secondary amines, N-acyl derivatives of free amino groups of the amino acid residues formed by reaction with acyl moieties (e.g., alkanoyl or aroyl groups), or O-acyl derivatives of free hydroxyl group (e.g., that of seryl or threonyl residues) formed by reaction with acyl moieties.

In particular embodiments of the present invention, the peptide derivative comprises an alkyl group attached to a free functional group of the peptide sequence.

In certain embodiments, the alkyl group is attached by an amide bond or linkage to a free amino group of a side chain or the N-terminus of the peptide. The alkyl group may be a $C_4$-$C_{30}$ alkyl, preferably a $C_8$ alkyl (herein octanoyl) which is attached by an amide linkage to the side chain of a Lys residue of the peptide sequence (Lys(Octanoyl)) or a terminal amino group of the peptide. The skilled in the art can appreciate that lysine has an amino-containing side chain. As such, peptides encompassing lysine may be modified through said lysine side chain amino functionality. Specifically, the lysine side chain amino group is a primary amine ($—NH_2$), which is convertible to an amide by its reaction with a carboxylic acid containing moiety. It is to be understood that the term "Lys(Octanoyl)" refers to the product of such a reaction, wherein the lysine amino side chain is reacted with octanoic acid thereby forming an octanoyl amide ($C_7H_{15}C(O)NH$) comprising an octanoyl group ($C_7H_{15}C(O)$). It is further to be understood that when referring to "alkyl" in the context of the chemical substitution of the lysine's amino side chain, the reference is to the group chemically bonded to the carbonyl. In other words, reference is made to a fragment having the chemical structure RC(O)NH, wherein R is an alkyl group, e.g. R is $C_7H_{15}$.

According to some embodiments, the C-terminus of the peptide is modified, to form an amide, alcohol or ester terminus. Each possibility represents a separate embodiment.

The peptides, derivatives and salts used in the compositions and methods of the present invention may be synthesized using any method known in the art including, but not limited to, solid phase and liquid phase peptide synthesis. Some of the peptides used in the compositions of the present invention may be produced using recombinant methods or combination of recombinant and synthetic methods.

In exemplary embodiments of the present invention, the peptide derivative is pGlu-Asn-Trp-Lys(Octanoyl)-OH (SEQ ID NO: 1; hereinafter referred to as "ZEP3"), wherein pGlu is pyroglutamic acid. ZEP3 can be produced, for example, by the procedure described in U.S. Pat. No. 7,220,725.

In another exemplary embodiment of the present invention, the peptide derivative is pGlu-Asn-Trp-Thr-OH (SEQ ID NO: 2; hereinafter referred to as "ZEP4"). ZEP4 can be produced, for example, by the following procedure:

The synthesis of ZEP4 may be performed by a sequential synthesis of 9-fluoromethoxycarbonyl (Fmoc) amino acids on a solid support of chlorotrityl chloride resin (CTC). CTC resin (125 gr) is loaded with Fmoc-Threonine (t-butyl; 79 gr) and diisopropyl ethylamine (DIPEA; 160 gr) is used as the coupling agent of the amino acid to the solid support. The Fmoc protecting group is removed by a mixture of 25% piperidine and dimethylformamide (DMF) and the resin-peptide is filtered and washed with DMF. A second amino acid, Fmoc-Trp (85 gr), is activated by a mixture of (2-(1H-benzotriazol-1-yl)-1,1,3,3-tetramethyluronium hexafluorophosphate (HBTU)/hydroxy benzothiazole (OHBT) coupled to the first amino acid by addition of DIPEA. The Fmoc group is removed as described hereinabove and the resin-peptide is filtered and washed with DMF. A third amino acid, Fmoc-Asn (trt) (119 gr) is activated by HBTU/HOBT and coupled by addition of DIPEA. The Fmoc group is removed as described hereinabove and the resin-peptide is filtered and washed with DMF. A fourth amino acid pGlu (26 gr) is activated by HBTU/HOBT and coupled by DIPEA.

The peptide-resin is thoroughly washed with DMF followed by IPA and dried under reduced pressure. The peptide is cleaved from the resin and protecting groups of the Thr and Asn by TFA (95%) and triisopropyl silane (TIS) (5%) at room temperature for 2 hours. The peptide is precipitated by addition of methyl tert-butyl ether (MTBE), filtered and dried (yield 46 gr).

The crude product (46 gr) is dissolved in a mixture of acetonitrile (ACN) and water and loaded on preparative HPLC system (4", RP C-18 100-120 A pore size) and purified using a gradient system containing Phase A—0.1% TFA in water; and Phase B—ACN. The elution is done by gradually increasing phase B (3% to 33%) during 45 minutes. Fractions having purity greater than 97% are collected. The combined fractions are eluted on the same HPLC system using a gradient containing Phase A: 0.2% Acetic acid; and Phase B: ACN. The elution is performed by gradually increasing phase B (10% to 40%) during 30 minutes. Fractions having purity greater than 97% are collected, combined, and lyophilized (yield 29 gr). The final product has M.W. (MS) of 530.5; and 97.3% purity (HPLC).

In one embodiment of the present invention, the peptide or peptide derivative is the sodium salt of the peptide derivative set forth in SEQ ID NO: 1 (pGlu-Asn-Trp-Lys(Octanoyl)-OH·nNa wherein n is 1 or 2; hereinafter referred to as "ZEP3 sodium salt" or "ZEP3Na"). In particular embodiments, the sodium salt of the peptide derivative comprises the following formula: pGlu-Asn-Trp-Lys(Octanoyl)-ONa. ZEP3 sodium salt can be produced, for example, by the following procedure:

ZEP3 (3.1 g) is solubilized in NaHCO$_3$ (100 mM) in water (50 g/l). The solution is injected into an HPLC ion exchange column (2.5×22 cm Luna C18, 100A, 15 micron) and eluted by a gradient consisting of: Mobile Phase A: NaHCO$_3$ 2 mM in H$_2$O; Mobile Phase B: NaHCO$_3$ 2 mM in CH$_3$CN/H$_2$O (8/2); and Mobile Phase C: NaHCO$_3$ 100 mM in water. Loading per run: 5% maximum (W/W % Peptide/Stationary Phase). Flow: 4.8 cm/min (24 ml/min). The gradient procedure is as follows: 20 min phase C; 5 min Phase A; 18 min Phase B; and 7 min Phase C. A fraction containing the product is collected and concentrated under reduced pressure to remove acetonitrile (110 g/l) then freeze dried [yield 2.2 g (71%)]. The final product has 99.7% purity (HPLC), 3.1% sodium content and solubility of 50 mg/ml water.

In another embodiment of the present invention the peptide is the sodium salt of the peptide set forth in SEQ ID NO: 2 (pGlu-Asn-Trp-Thr-OH·nNa wherein n is 1 or 2; hereinafter referred to as "ZEP4 sodium salt" or "ZEP4Na"). In particular embodiments, the sodium salt of the peptide comprises the following formula: pGlu-Asn-Trp-Thr-ONa. ZEP4 sodium salt can be produced, for example, by the following procedure:

ZEP4 (5 g) is solubilized in NaHCO$_3$ (100 mM) in water (50 g/l). The solution is injected into an HPLC ion exchange column (2.5×22 cm Luna C18, 100A, 15 micron) and eluted by a gradient consisting of: Mobile Phase A: NaHCO$_3$ 2 mM in H$_2$O; Mobile Phase B: NaHCO$_3$ 2 mM in CH$_3$CN/H$_2$O (8/2); and Mobile Phase C: NaHCO$_3$ 100 mM in water. Loading per run: 5% maximum (W/W % Peptide/Stationary Phase). Flow: 4.8 cm/min (24 ml/min). The gradient procedure is as follows: 20 min phase C; then 5 min Phase A; then 20 min Phase B; and 10 min Phase C. A fraction containing the product is collected and concentrated under reduced pressure to remove acetonitrile (110 g/l) then freeze dried [yield 4 g (80%)]. The final product has 97.5% purity (HPLC), 2.5% sodium content and solubility of 50 mg/ml water.

The peptides, peptide derivatives and/or salts of the present invention can be used as anti-aging agents per se or as part (active ingredient) of a composition together with a dermatologically acceptable carrier. In accordance with these embodiments, the composition comprises from about 0.1% to about 5% w/w of the peptide, peptide derivative or salt thereof, including each value within the specified range. According to other embodiments, the composition comprises from about 0.5% to about 2% w/w of the peptide, peptide derivative or salt thereof, including each value within the specified range. According to yet other embodiments, the composition comprises about 1% of the peptide, peptide derivative or salt thereof. In various embodiments, the amount of peptide, peptide derivative or salt thereof ranges from about 200 μg to about 800 μg per gram composition, including each value within the specified range. In further embodiments, the amount of peptide, peptide derivative or salt thereof ranges from about 300 μg to about 700 μg per gram composition, including each value within the specified range. In additional embodiments, the amount of peptide, peptide derivative or salt thereof ranges from about 400 μg to about 600 μg per gram composition, including each value within the specified range. In particular embodiments, the amount of peptide, peptide derivative or salt thereof is about 500 μg per gram composition.

As used herein a "composition" refers to a preparation of the peptide of formula I with one or more chemical components such as dermatologically acceptable carriers designed to facilitate administration of a compound to a subject, preferably a human subject. The term "dermatologically acceptable carrier" as used herein refers to an excipient that does not cause significant irritation to the skin and does not abrogate the beneficial activity and properties of the peptide of the present invention. Suitable dermatologically acceptable carriers within the scope of the present invention include, but are not limited to, a thickener, a filler, a moisturizer, an emulsifier, a humectant, a surfactant, a buffering or pH adjusting agent, a film forming agent, a foaming agent, an anti-foaming agent, a preservative, an anti-oxidant, a fragrance, a solvent, a propellant, a colorant, and a combination or mixture thereof. Each possibility represents a separate embodiment.

Suitable thickeners include, but are not limited to, fatty acids and alcohols such as stearic acid and stearyl alcohol;

gums such as xanthan, carrageenan, gelatin, cellulose gum, agarose, karaya, pectin, amylopectin, and locust beans gum; and various polymers such as hydroxypropyl methylcellulose (HPMC), hydroxypropyl cellulose (HPC), hydroxymethyl cellulose, hydroxyethyl cellulose, methyl cellulose, calcium carboxymethyl cellulose, polyvinylpyrrolidone (povidone, PVP), polyvinyl alcohol, medium to high molecular weight polyethylene glycols (PEG-3350, PEG-6000, etc.), glucosides, tetrasodium etidronate, polyacrylic acid, polymethacrylic acid, acrylamides copolymer, sodium acrylates copolymer, sodium alginate, calcium alginate, magnesium alginate, alginic acid, hyaluronic acid, polyglucuronic acid (poly-α- and -β-1,4-glucuronic acid), chondroitin sulfate, furcellaran, carboxymethylcellulose, polycarboxylic acids, carbomer, bentonite, chitin, chitosan, carboxymethyl chitin, and cross-linked polyacrylate materials available under the trademark Carbopol®. Each possibility represents a separate embodiment. In one embodiment, the composition comprises from about 0.5% to about 50% w/w of a thickener, including each value within the specified range.

Suitable fillers include, but are not limited to, mica, talc, silicon dioxide (e.g. silica), nylon, polyethylene, polymethacrylate, kaolin, calcium carbonate, calcium phosphate, microcrystalline cellulose, various sugars and types of starch, polysugars, dextrin, cyclodextrins (e.g. β-CD, hydroxypropyl-β-CD, sulfobutylether-CD), and Teflon. Each possibility represents a separate embodiment. In one embodiment, the composition comprises from about 0.5% to about 50% w/w of a filler, including each value within the specified range.

Suitable moisturizers include, but are not limited to, glycerin, hydrocarbon oils and waxes, including mineral oil, petrolatum, paraffin, ceresin, ozokerite, microcrystalline wax, polyethylene, and perhydrosqualene; silicone oils; triglyceride fats and oils, including those derived from vegetable, animal and marine source including jojoba oil and shea butter; acetoglyceride esters, such as acetylated monoglycerides; ethoxylated glycerides, such as ethoxylated glyceryl monostearate; fatty acids, fatty alcohols and derivatives thereof. Other suitable emollients include, but are not limited to, caprylic or capric triglyceride; lanolin and lanolin derivatives; polyhydric alcohols and polyether derivatives; polyhydric alcohol esters; wax esters; vegetable waxes; phospholipids, such as lecithin and derivatives; sterols, including, but not limited to, cholesterol and cholesterol fatty acid esters; amides, such as fatty acid amides, ethoxylated fatty acid amides, and solid fatty acid alkanolamides. Each possibility represents a separate embodiment. In one embodiment, the composition comprises from about 0% to about 10% w/w of a moisturizer, including each value within the specified range.

Suitable emulsifiers include, but are not limited to, polyethylene glycol ethers of stearic acid such as steareth-2, steareth-4, steareth-6, steareth-7, steareth-10, steareth-11, steareth-13, steareth-15, and steareth-20, glyceryl stearate, stearyl alcohol, cetyl alcohol, cetearyl alcohol, behenyl alcohol, diethanolamine, lecithin, and polyethylene glycols. Each possibility represents a separate embodiment. In one embodiment, the composition comprises from about 0% to about 10% w/w of an emulsifier, including each value within the specified range. In another embodiment, the composition comprises from about 0% to about 5% w/w of an emulsifier, including each value within the specified range.

Suitable humectants include, but are not limited to, glycols such as triethylene glycol, tripropylene glycol, propylene glycol, polypropylene glycols, butylene glycol, polyethylene glycols, sugar alcohols such as sorbitol, hexylene, urea, and collagen. Each possibility represents a separate embodiment. In one embodiment, the composition comprises from about 0% to about 5% w/w of a humectant, including each value within the specified range.

Suitable surfactants are cationic, anionic or zwitterionic including, but not limited to, polyoxyethylene glycol octylphenol ethers, polyoxyethylene glycol alkylphenol ethers, polyoxyethylene glycol sorbitan alkyl esters (polysorbate 60, polysorbate 80, etc.), sorbitan alkyl esters, block copolymers of polyethylene glycol and polypropylene glycol (poloxamer), polyethyleneglycol-tocopheryl succinate, DL a tocopheryl acetate, polyethoxylated castor oil derivatives (cremophor EL, Cremophor RH40), dioctyl sodium sulfosuccinate, perfluorooctanesulfonate, alkylbenzene sulfonates, sodium lauryl ether sulfate, ammonium laureth sulfate, ammonium lauryl sulfate, disodium laureth sulfosuccinate, lignosulfonate, sodium stearate, benzalkonium chloride, cetylpyridinium chloride, benzethonium chloride, cetyl trimethylammonium bromide, cetyl trimethylammonium chloride, and betaines. Each possibility represents a separate embodiment. In one embodiment, the composition comprises from about 0% to about 30% w/w of a surfactant, including each value within the specified range. In another embodiment, the composition comprises from about 0% to about 20% w/w of a surfactant, including each value within the specified range. In yet another embodiment, the composition comprises from about 0% to about 5% w/w of a surfactant, including each value within the specified range.

Suitable buffering or pH adjusting agents include, but are not limited to, acidic buffering or pH adjusting agents such as short chain fatty acids, citric acid, acetic acid, hydrochloric acid, sulfuric acid and fumaric acid; and basic buffering or pH adjusting agents such as tris, sodium carbonate, sodium bicarbonate, sodium hydroxide, potassium hydroxide, and magnesium hydroxide. Each possibility represents a separate embodiment. In one embodiment, the composition comprises from about 0% to about 10% w/w of a buffering or pH adjusting agent, including each value within the specified range. In another embodiment, the composition comprises from about 0% to about 1% w/w of a buffering or pH adjusting agent, including each value within the specified range.

Suitable film forming agents include, but are not limited to, polyvinylpyrrolidone, acrylates, acrylamides, methacrylates, shellac, acacia, and hydroxyethylcellulose. Each possibility represents a separate embodiment. In one embodiment, the composition comprises from about 0% to about 20% w/w of a film forming agent, including each value within the specified range.

Suitable foaming agents include, but are not limited to, isopropyl myristate, oxyalkylated sulfates and ethoxylated alcohol sulfates. Each possibility represents a separate embodiment. In one embodiment, the composition comprises from about 0% to about 10% w/w of a foaming agent, including each value within the specified range.

Suitable anti-foaming agents include, but are not limited to, simethicone, and sorbitan sesquoleate. Each possibility represents a separate embodiment. In one embodiment, the composition comprises from about 0% to about 10% w/w of an anti-foaming agent, including each value within the specified range.

Suitable preservatives include, but are not limited to, methylparaben, propylparaben, butylparaben, ethylparaben, potassium sorbate, trisodium EDTA, tetrasodium EDT, edetate disodium, benzophenone, 2-bromo-2-nitropane-1,3-diol, butylated hydroxytoluene, chlorhexidine digluconate, citric acid, DMDM hydantoin, formaldehyde, methylchloroisothiazolinone, methylisothiazolinone, methyldibromo glutaronitrile, sodium benzoate, phenoxyethanol, ethyl alcohol, benzyl alcohol, diazolidinyl urea, imidazolidinyl urea, and quaternium-15. Each possibility represents a separate embodiment. In one embodiment, the composition comprises from about 0% to about 5% w/w of a preservative, including each value within the specified range.

Suitable anti-oxidants include, but are not limited to, ascorbic acid, ubiquinone, tocophenyl acetate, and sodium bisulfite. Each possibility represents a separate embodiment. In one embodiment, the composition comprises from about 0% to about 10% w/w of an anti-oxidant, including each value within the specified range.

Suitable fragrances include, but are not limited to, chamomile oil, lavender oil, and various plant extracts such as camellia sinesis. Each possibility represents a separate embodiment. In one embodiment, the composition comprises from about 0% to about 5% w/w of a fragrance, including each value within the specified range.

Suitable solvents include, but are not limited to, water, lower alcohols such as ethanol and isopropanol, propylene glycol, ammonium xylenesulfonate, and low molecular weight polyethylene glycols such as, e.g. PEG-300, PEG-1450 etc. Each possibility represents a separate embodiment. In one embodiment, the composition comprises from about 0% to about 90% w/w of a solvent, including each value within the specified range. In another embodiment, the composition comprises from about 0% to about 50% w/w of a solvent, including each value within the specified range. In yet another embodiment, the composition comprises from about 0% to about 10% w/w of a solvent, including each value within the specified range.

Suitable propellants include, but are not limited to, hydrocarbons having 4 to 7 carbon atoms such as isopentane. Additional propellants include, but are not limited to, chlorinated, fluorinated and chlorofluorinated lower molecular weight hydrocarbons as well as nitrous oxide, carbon dioxide, butane, and propane. Each possibility represents a separate embodiment. The propellants may be used in a quantity and under a pressure suitable to provide proper release of the peptide from the container at the appropriate amount.

Suitable colorants include, but are not limited to, alumina (dried aluminum hydroxide), annatto extract, calcium carbonate, canthaxanthin, caramel, β-carotene, cochineal extract, carmine, potassium sodium copper chlorophyllin (chlorophyllin-copper complex), dihydroxyacetone, bismuth oxychloride, synthetic iron oxide, ferric ammonium ferrocyanide, ferric ferrocyanide, chromium hydroxide green, chromium oxide greens, guanine, mica-based pearlescent pigments, pyrophyllite, disodium dityrylbiphenyl, mica, dentifrices, talc, titanium dioxide, aluminum powder, bronze powder, copper powder, and zinc oxide or a mixture or combination thereof. Each possibility represents a separate embodiment. In one embodiment, the composition comprises from about 0% to about 5% w/w of a colorant, including each value within the specified range.

Additional ingredients that may be included in the compositions of the present invention are sunscreens and tanning agents. Sunscreens include those materials commonly employed to block UV light. Illustrative compounds are the derivatives of PABA, cinnamate and salicylate. For example, octyl methoxycinnamate and 2-hydroxy-4-methoxy benzophenone (also known as oxybenzone) can be used. Octyl methoxycinnamate and 2-hydroxy-4-methoxy benzophenone are also known as parsol MCX and benzophenone-3, respectively. If present in the composition, the amount of sunscreen employed can vary depending upon the desired degree of protection from UV radiation. The sunscreen must be compatible with the active compound but in general the composition may comprise from about 0.5% to about 20% w/w of a sunscreen, including each value within the specified range. Exact amounts will vary depending upon the sunscreen chosen and the desired Sun Protection Factor (SPF).

Further ingredients that may be included in the compositions of the present invention are vitamins and vitamin derivatives such as, for example vitamin A, vitamin B, vitamin D, vitamin E, vitamin K and derivatives thereof including, for example, α tocopherol; and various plant extracts such as, for example *Aloe vera, Aloe barbadensis*, castor oil, *Citrus limonium, Citrus paeadisi, Citrus sinensis, Elaesis guineensis*, etc. Each possibility represents a separate embodiment.

The compositions of the present invention may be manufactured by processes well known in the art, e.g., by means of conventional mixing, dissolving, suspending, solubilizing, granulating, levigating, emulsifying, encapsulating, entrapping, spray-drying, or lyophilizing processes. They may be formulated in a conventional manner using one or more dermatologically acceptable carriers as described above, which facilitate processing of the peptides and peptide derivatives and salts into preparations which can be used dermatologically. Proper formulation is dependent upon the route of administration chosen. In particular, the compositions of the present invention are formulated for topical application or intradermal administration. Each possibility represents a separate embodiment.

For topical or intradermal administration, the compositions of the present invention may be formulated as an oil, a gel, a stick, a lotion, a cream, a milk, an aerosol, a spray, a foam, a mousse, an ointment, liquid drops, nebulized liquid, a liquid wash, an emulsion, a suspension, liposomes, an adhesive patch, and a powder. Each possibility represents a separate embodiment. Currently preferred are compositions formulated as a gel, an ointment, a cream or an emulsion. Each possibility represents a separate embodiment. Encompassed within the present invention are emulgel compositions which comprise an emulsion (e.g., oil-in-water or water-in-oil) and a gel (e.g., a hydrogel or a hydroalcoholic gel) and possess the advantages of both emulsions and gels, for example as being easily spreadable and easily removable. Alternative forms of the compositions of the present invention may also be used including forms which are designed for reconstitution with a suitable vehicle prior to use. Intradermal delivery of the peptides, peptide derivatives or salts thereof through nanoneedles or microneedles for example using a patch as described in Larraneta et al. (Mater. Sci. Eng. R 104: 1-32, 2016) is also contemplated within the scope of the present invention. Optionally, a combination with other anti-aging treatments may be used.

The compositions of the present invention are useful in treating, preventing, minimizing, diminishing or reversing an epidermal condition related to aging. As used herein, the term "an epidermal condition related to aging" refers to age-related elastosis, atrophy of the skin, fine lines or wrinkles, skin imperfections, enlarged pores, spots including lentigines or solar lentigines, uneven skin tone or texture, UV radiation-induced damaged skin or photodamaged skin, hyperpigmented skin or melasmas, dry skin, sagging skin, rough skin, and any combination thereof. Each possibility represents a separate embodiment. The compositions described herein may also be used for treating, preventing, minimizing, diminishing, or reversing the visible signs of scars such as, but not limited to, acne scars and chickenpox scars. Within the scope of the present invention is the treatment of aging skin, skin imperfections and scars. It is to be understood that treatment, prevention, minimization, diminishment, or reversal of an epidermal condition related to aging according to the present invention does not include the treatment of a skin disorder selected from the group consisting of Herpes viral infection, Varicella viral infection, rash, insect bites, jellyfish stings, burns, psoriasis, itching, skin allergic response, skin lesions as a result of drug or medical treatment side effects or complications, and hypopigmentation.

The terms "treating, preventing, minimizing, diminishing or reversing" in the context of the present invention include at least one of the following: improving the firmness or elasticity of skin, smoothing of fine-lines or wrinkles, reducing skin pores, reducing hyperpigmentation, increasing skin thickness, radiance and/or softness, and reducing dry skin. Each possibility represents a separate embodiment. Treatment, prevention, minimization, diminishment or reversal of the condition can be assessed as is known in the art and includes, a beneficial outcome or improvement that is manifested by enhancement in the appearance of the skin, for example by decreasing the appearance of wrinkles. This includes, for example, reducing oxidative damage in the skin.

Compositions suitable for use in the context of the present invention include compositions wherein the peptide, derivative or salt of the invention is contained in an amount effective to achieve the intended purpose. More specifically, an effective amount means an amount of the peptide, derivative or salt which is effective to treat, prevent, minimize, diminish or reverse at least one symptom of an epidermal condition related to aging. Determination of an effective amount is well within the capability of those skilled in the art, especially in light of the detailed disclosure provided herein. For any preparation used in the methods of the invention, the effective amount can be estimated initially from in vitro and cell culture assays as described in e.g. Nakamura et al. (Exper. Derma. 27:495-500, 2018). For example, a certain dose can be formulated in an animal model to achieve a desired concentration or titer. Such information can be used to more accurately determine useful doses in humans. The dosage may vary depending upon the dosage form employed and the route of administration utilized. The exact formulation, route of administration and dosage can be chosen in view of the subject's condition. Although the compositions of the present invention may be administered at a single dose, multiple administrations at certain intervals are contemplated within the scope of the present invention. These may be adjusted according to individual characteristics and route of administration depending on the severity and responsiveness of the epidermal condition. The duration of treatment may last from several days to several weeks, months or years as desired. Typical dosages of the peptide, derivative or salt encompassed by the present invention include, but are not limited to, about 0.01 to about 1,000 mg/kg of body weight, about 0.1 mg/kg to about 100 mg/kg, about 1 mg/kg to about 100 mg/kg, about 10 mg/kg to about 75 mg/kg, about 0.1 mg/kg to about 1 mg/kg etc., including each value within the specified ranges. Exemplary non-limiting amounts include about 0.1 mg/kg, about 0.2 mg/kg, about 0.5 mg/kg, about 1 mg/kg, about 5 mg/kg, about 10 mg/kg, about 20 mg/kg, about 50 mg/kg, about 60 mg/kg, about 75 mg/kg, about 100 mg/kg, about 200 mg/kg, about 300 mg/kg, about 400 mg/kg, about 500 mg/kg, about 600 mg/kg, about 700 mg/kg, about 800 mg/kg, about 900 mg/kg, or about 1,000 mg/kg. Each possibility represents a separate embodiment. Alternatively, the amount administered can be measured and expressed as molarity of the administered peptide, derivative or salt. By way of illustration and not limitation, the peptide, derivative or salt can be administered in a range of about 0.1 to about 10 mM, including each value within the specified range e.g., about 0.1, about 0.25, about 0.5, about 1 about 2, about 3, about 4, about 5, about 6, about 7, about 8, about 9, or about 10 mM. Each possibility represents a separate embodiment. Alternatively, the amount administered can be measured and expressed as mg/ml, µg/ml, or ng/ml.

As used herein, the term "administering" refers to bringing in contact with the peptide, derivative or salt of the present invention or a composition comprising same. Typically, administration can be accomplished by topically applying an effective amount of the composition to a region of the skin which exhibits an epidermal condition related to aging. Administration can be accomplished to living organisms, for example humans.

As used herein the term "about" refers to ±10%.

The terms "comprise", "comprising", "include", "including", "having" and their conjugates mean "including, but not limited to".

As used herein, the singular forms "a", "an" and "the" include plural references unless the context clearly dictates otherwise. For example, the term "a peptide" or "a carrier" may include a plurality of peptides and carriers, including mixtures thereof.

Throughout this application, various embodiments of the invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as $C_4$-$C_{30}$ alkyl should be considered to have specifically disclosed subranges such as, but not limited to $C_4$-$C_{25}$ alkyl, $C_4$-$C_{20}$ alkyl, $C_4$-$C_{15}$ alkyl, $C_4$-$C_{10}$ alkyl, $C_6$-$C_{10}$ alkyl, etc., as well as individual numbers within that range, for example, $C_5$ alkyl, $C_7$ alkyl, $C_8$ alkyl etc. This applies regardless of the breadth of the range. Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate the invention in a non-limiting fashion.

Example 1. Formulations

Exemplary formulations of the present invention are outlined in Tables 1-3 below:

TABLE 1

| Ingredient | % (w/w) |
| --- | --- |
| ZEP3Na | 1.00 |
| Propylene glycol | 65.20 |
| Polysorbate 80 | 4.00 |
| EDTA | 0.05 |
| Silicon dioxide | 0.10 |
| Methyl paraben | 0.15 |
| White petrolatum | 5.40 |
| Isopropyl myristate | 2.00 |
| Cetyl alcohol | 2.00 |
| Glyceryl monostearate | 1.00 |
| Water | 19.10 |
| Total | 100.0 |

TABLE 2

| Ingredient | % (w/v) |
| --- | --- |
| ZEP3/ZEP3Na/ZEP4/ZEP4Na | 1.0 |
| Propylene glycol | 63.0 |
| Glycerin | 1.0 |
| Polysorbate 80 | 4.0 |
| Edetate disodium | 0.05 |
| Xanthan gum | 0.2 |
| Silicon dioxide | 0.1 |
| Methyl paraben | 0.15 |
| White petrolatum | 5.4 |
| Isopropyl myristate | 2.0 |
| Cetyl alcohol | 1.0 |
| Stearyl alcohol | 2.0 |
| Glyceryl monostearate | 1.0 |
| Water or buffer (pH 5.5) | 19.1 |
| Total | 100.0 |

TABLE 3

| Ingredient | % (w/w) |
| --- | --- |
| ZEP3 | 1.0 |
| Propylene glycol | 10.0 |
| PEG-300 | 55.0 |
| PEG-1450 | 15.0 |
| PEG-6000 | 1.0 |
| PEG-3350 | 15.0 |
| Silicon dioxide | 1.0 |

TABLE 3-continued

| Ingredient | % (w/w) |
| --- | --- |
| Polysorbate 60 | 1.0 |
| Sodium saccharin | 0.5 |
| Cherry flavor | 0.5 |
| Total | 100.0 |

ZEP-3 Na Chitosan Gel:

Gel was prepared by dissolving 2% (w/v) of high molecular weight (2,000,000) chitosan having a degree of deacetylation (DD) of 92% in 1% (v/v) aqueous acetic acid. Methyl paraben sodium salt (0.1%, w/w) as a preservative was then added. The sample was stirred and the resulting gel was sonicated to remove air bubbles. The obtained gel composition together with ZEP3 Na is outlined in Table 4 below.

TABLE 4

| Ingredient | Amount in grams |
| --- | --- |
| ZEP3 Na | 0.35 |
| Propylene glycol | 5.0 |
| Chitosan | 0.7 |
| Methyl paraben | 0.03 |
| Water with 0.1% acetic acid | 26.62 |
| Total | 32.7 |

ZEP-3 Na Chitin Ointment:

Water-soluble chitin (WSC) (0.35 g) was dissolved at room temperature in water (15 ml) containing 0.01% of acetic acid. Zep-3 Na (0.35 g) was dissolved in propylene glycol and added to the aqueous solution. White Vaseline (6 g) and stearyl alcohol (6 g) were mixed and slowly heated up to 70° C., and then stirred into the WSC solution at 70° C. to give an emulsion. The emulsion was slowly cooled down to room temperature to give a water-soluble ointment. The composition is outlined in Table 5 below.

TABLE 5

| Ingredient | Amount in grams |
| --- | --- |
| ZEP3 Na | 0.35 |
| Propylene glycol | 5.0 |
| Chitin | 0.35 |
| White Vaseline | 6 |
| Stearyl alcohol | 6 |
| Water with 0.01% acetic acid | 15 |
| Total | 32.7 |

ZEP-3 Na Emulgel:

Emulsion comprised of DL a tocopheryl acetate solubilized in medium chain triglyceride (Caprylic/capric oil, Mygliol) forms the oil phase of the emulsion. Aqueous phase composed of the ZEP3 Na, propylene glycol and glycerin as humectants, and Tween 80 and polyethylene glycol as surfactants was dispersed in water. Methyl paraben and propyl paraben as preservatives were dispersed in propylene glycol. Both the oily and aqueous phases were heated separately in water baths at 70-75° C. and then mixed under continuous stirring using a high shear homogenizer for 2 hours to obtain a stable emulsion. The composition is outlined in Table 6 below.

TABLE 6

| Ingredient | % (w/w) |
| --- | --- |
| ZEP3 Na | 1 |
| Propylene glycol | 9 |
| DL α tocopheryl acetate | 1 |
| Caprylic/capric triglyceride | 5 |
| Tween 80 | 1 |
| Glycerin | 3 |
| PEG 600 + 200 | 0.3 |
| Methyl paraben | 0.2 |
| Propyl paraben | 0.02 |
| Water with 0.01% acetic acid | 79.48 |
| Total | 100 |

Cyclodextrin/Poloxamer ZEP3 Na Topical Formulation:

Cyclodextrin inclusion complexes with ZEP-3 Na were prepared from a solution of cyclodextrin dissolved in water after stirring for several hours at room temperatures followed by the addition of ZEP-3 Na and additional mixing for 2 hours until complete dissolution. DL a tocopheryl acetate, methyl paraben, and propyl paraben were then added sequentially followed by mixing until complete dissolution. Poloxamers as thickening agents were then added to impart viscosity and semi-solid consistency. The composition is outlined in Table 7 below.

TABLE 7

| Ingredient | % (w/w) |
| --- | --- |
| ZEP3 Na | 1 |
| DL α tocopheryl acetate | 1 |
| Cyclodextrin (β-CD, hydroxypropyl-β-CD, or sulfobutylether-CD) | 10-30 |
| Methyl paraben | 0.2 |
| Propyl paraben | 0.02 |
| Poloxamer (Kolliphor P407 or P188) | 10-20 |
| Purified water | q.s. |
| Total | 100 |

ZEP-3 Na Cream:

ZEP3 Na was dissolved in propylene glycol and added to an aqueous phase containing glycerin, methyl paraben, and deionized water. An oily phase containing stearic acid, cetyl alcohol, and liquid paraffin was prepared. Both the oily and aqueous phases were heated separately in water baths at 70-75° C. and then mixed under continuous stirring using a high shear homogenizer for 2 hours to obtain a homogeneous cream followed by cooling down for additional 2 hours. The composition is outlined in Table 8 below.

TABLE 8

| Ingredient | % (w/w) |
| --- | --- |
| ZEP3 Na | 1 |
| Stearic acid | 10 |
| Cetyl alcohol | 6 |
| Liquid paraffin | 6.6 |
| Glycerin | 5 |
| Methyl paraben | 0.05 |
| Propylene glycol | 29 |
| Deionized water | 42.35 |
| Total | 100 |

Example 2. Absorption into the Epidermis

In order to evaluate the amount of peptide remaining in the skin following application, a skin permeation study was performed. The study compared the permeation profile of ZEP3 and ZEP3Na applied as either a cream or an ointment containing 1% w/w of peptide as detailed in Example 1, Tables 2 and 3, respectively. The skin permeation study was conducted using a vertical diffusion cell (Franz cell) by withdrawing samples at specific time intervals. In vitro reconstructed human epidermis tissues from normal keratinocytes, exhibiting a highly similar structure and morphology to the in vivo human epidermal tissue, were employed.

Skin Tissue

Mattek's EpiDerm™ X (EPI-606-X) tissue was used as reconstructed human skin model. Prior to testing, the tissue culture was visually examined for its integrity. Trans-epidermal water loss (TEWL) was measured using a Cortex Technology DermaLab® instrument equipped with a DermaLab® Series TEWL probe. An exclusion criterion of TEWL values above 16 g $m^{-2}$ $h^{-1}$ was set for possible impairment in skin barrier integrity (Pinnagoda et al. Contact Dermatitis, 22, 164-178, 1990; McPhail et al. Presentation at American Academy of Dermatology, New Orleans, LA, Feb. 19, 2005). A skin viability test was performed following testing in order to ensure that the metabolic activity of Mattek's EpiDerm™ X (EPI-606-X) tissue was maintained throughout the in vitro permeation experiment, without being affected by the experimental conditions and the activity of the peptide. Tissue viability was determined by monitoring the conversion of MTT (a water-soluble tetrazolium dye) to the insoluble purple metabolite, formazan. The skin tissue viability test showed that the reconstructed human epidermis tissues maintained their viability and their metabolic activity throughout the in-vitro permeation test.

Setup of the Vertical Diffusion Cell—In Vitro Permeation Test

The SES Gmbh Analysesyteme vertical diffusion cell device composed of six cells, each containing a donor chamber and a receptor chamber, was used in this study. A Julabo GmbH Model ED open bath circulator was used for temperature conditioning of the receptor medium. Prior to testing, the tissue culture inserts were placed on a few paper towels soaked in phosphate buffered saline. A suitable section was then cut using a sterile surgical scalpel and mounted between each cell's donor and receptor chambers of the vertical diffusion cell. The tissue was left to equilibrate with 5 mL of degassed receptor medium that was prefilled in the receptor compartment for 30 minutes. Throughout the experiment and 30 minutes prior to its initiation, the temperature was maintained at 32±1° C. The receptor medium was continuously stirred using a magnetic stirrer.

Mattek EPI-100-MM maintenance medium was selected as the receptor medium with DMSO as a diluent (Mattek EPI-100-MM:DMSO=9:1). In each diffusion cell, the available contact area of the skin tissue with the receptor medium was 0.636 $cm^2$. Following the skin integrity test, 12.7 mg of the cream or ointment formulation was uniformly applied on the skin tissue using an inoculation loop. Control solutions of ZEP3 and ZEP3Na reference standard were also tested per se. A quantity of approximately 127 μg of ZEP3 or ZEP3Na was applied on two separate skin tissues, by means of a concentrated solution diluted in receptor medium.

After dose application, the vertical cell was properly assembled and visually inspected to ensure the absence of air bubbles in the receptor compartment. Samples were collected at 0, 4, 8, 20, 22, and 24 hrs. At each sampling time point, 1 mL of receptor fluid was collected in a glass vial and replaced with fresh receptor medium. A portion of the collected sample equal to 0.9 mL was transferred to a sample vial for analysis and 0.1 mL of DMSO was added. The solution was mixed by a vortex mixer for 10 sec and placed under autosampler conditions for analysis. At the end of the permeation experiment, the remaining quantities of ZEP3 or ZEP3Na were determined in the applicator, donor compartment, and receptor compartment.

Determination of ZEP3 and ZEP3Na from In-Vitro Permeation Test Samples

Skin samples were tested using a Thermo Accela ultra-performance liquid chromatography system composed of a pump, an autosampler and a PDA 80 Hz detector, coupled to a Thermo Scientific LTQ-Velos (Linear Trap Quadrupole—Orbitrap) mass spectrometer employing HESI (heated electrospray source). The column used was Fortis C18 1.7 µm, 100×2.1 mm, Fortis technologies, Part no: F18-020501A, with the following chromatographic parameters: Mobile phase A: 0.01% v/v Trifluoracetic Acid aqueous solution; Mobile phase B: 0.01% v/v Trifluoracetic Acid solution in 80/20 Acetonitrile/Water; Autosampler solution: 80/20 v/v % Acetonitrile/Water; Injection volume: 10 µL; Column oven temperature: 40° C.; Autosampler temperature: 25° C.; and Run time: 20 min. The gradient elution program is outlined in Table 9 below:

TABLE 9

| Time (min) | Mobile Phase A % v/v | Mobile Phase B % v/v | Flow rate (mL/min) |
|---|---|---|---|
| 0 | 90 | 10 | 0.200 |
| 1.0 | 90 | 10 | 0.200 |
| 8.0 | 25 | 75 | 0.200 |
| 11.0 | 0 | 100 | 0.200 |
| 14.5 | 0 | 100 | 0.200 |
| 15.0 | 90 | 10 | 0.200 |
| 20.0 | 90 | 10 | 0.200 |

The following MS parameters for determination of ZEP3 and ZEP3Na were used: Acquisition mode: Positive ionization mode, Full Scan 110-1500 m/z; MS Acq. time: 20 min; Sheath gas flow rate (arb): 30; Aux gas flow rate (arb): 10; Spray Voltage: 3.5 kV; Capillary Temperature: 250° C.; and Heater Temperature: 350° C.

In order to produce the calibration curve for the determination of ZEP3 and ZEP3Na concentrations, standard stock solutions of ZEP3 in DMSO at concentrations of 10 µg/mL, 200 ng/mL, 100 ng/mL, 50 ng/mL, 10 ng/mL, and 5 ng/mL were prepared.

In order to calculate the cumulative percentage of ZEP3 permeated, the total applied dose was determined as well as the amount of ZEP3 permeated at the first measured time point and the cumulative amount of drug permeated at subsequent measured time points. The results show that both molecules ZEP3 and ZEP3Na exhibit negligible skin permeation in both ointment and cream formulations below 0.02% of the applied dose. Moreover, ZEP3 and ZEP3Na control solutions also exhibit negligible skin permeation (<0.02%). All measurements conducted in the receptor fluid samples are below the limit of quantitation, which corresponds to a concentration of 5 ng/mL. In all cases, the % permeation was below 0.02% of the total applied dose. Thus, it is concluded that substantially all peptide remains in the skin following application thereby exerting its anti-aging effect according to embodiments of the present invention.

The skin metabolism of ZEP3 and ZEP3Na was also investigated. Full scan HRMS chromatograms were acquired for the samples, in both positive and negative ESI mode, in order to identify possible metabolites of the target analytes. Differential analysis between the samples through the experiment (t=4, 8, 20, 22, and 24 h) and the sample at time zero was performed. Evaluation of the fragmentation profile through MS/MS experiments was also performed in order to provide additional information. No metabolites of ZEP3 and ZEP3Na were identified.

Example 3. The Effect of ZEP3 and ZEP3Na in Human Keratinocytes

In order to determine the anti-aging effect of ZEP3 and ZEP3Na on human keratinocytes, SCCE020 cells (EpiGRO™ Human Epidermal Keratinocytes) were grown in complete growth medium (EpiGRO™ Human Keratinocytes Complete Medium; Millipore Cat. #SCMK001) for 4 passages. At passage 5, cells were seeded ($3 \times 10^5$ cells/well) in triplicates in a volume of 1 ml complete growth medium per well. Additional 3 control wells contained only medium without cells. Upon adherence, cell medium was replaced by basal medium containing L-Glutamine without supplements (starvation medium) and cells were starved overnight. The next day, 24 hours after seeding, the cells were treated with ZEP3 or ZEP3Na or appropriate diluent (PBS or DMSO). After 4 hours of incubation, LPS (from *E. coli* 055: B5; Sigma Cat. #L6529-1MG) was added to the wells in final concentration of 20 or 30 µg/ml.

Cells were incubated for 24 hours in tissue culture incubator. After collecting cell supernatants from all wells, cells from treatment groups: 1, 2, 3, 8, 9, 10, 13, 14 (without DMSO groups) were pelleted and stored at −80° C. for further analyses. The cells were collected and treated as follows: upon supernatants collection, the wells were rinsed with trypsin, then incubated with trypsin until they detached from the plate surface, centrifuged, washed with PBS and stored as a cell pellet.

Example 4. In-Vitro Assay

In order to evaluate the in vitro efficacy of the peptide of the invention, two model systems are used. The first utilizes a spontaneously immortalized human keratinocyte, referred to as "HaCat" cell line (Ockenfels et al., Arch. Dermatol. Res., 287:304-309, 1995; Paramio et al., Brit. J. Dermatol., 137:44-50, 1997) and the second utilizes rapidly proliferating human keratinocytes (Nickoloff et al., Am. J. Pathol., 131(1):12-8, 1988). The immortalized human keratinocyte HaCat cells are routinely cultured in 75 cm² flasks using Eagle's minimal essential medium (MEM-EAGLE) supplemented with 5% fetal calf serum (FCS) and 1% antibiotics (penicillin 20 units/ml; streptomycin 20 µg/ml and nystatin 2.5 units/ml) at 37° C. in 95% air/5% $CO_2$. The medium is replaced every 3-4 days.

Long-term cultures of HaCat cells grown with ZEP3, ZEP4, or salts thereof are obtained by cultivating HaCat cells, for 6 months, in routinely used medium. Human Epidermal Keratinocytes (passages 3-6), obtained from normal face-lift surgery, are cultivated in serum-free KGM®-2 BulletKit® (Clonetics, USA) medium with low calcium for accelerated proliferation of the keratinocytes.

The viability and/or proliferation of HaCat cells and cultured human epidermal keratinocytes, following treatment with ZEP3, ZEP4, or salts thereof are determined by the MTT assay, according manufacturer's instructions in 96-well microtiter plates. In brief, an equal number of cells are seeded in each well and incubated for 24 hours. ZEP3, ZEP4, or salts thereof are added and the wells are incubated for additional 72 hours. 20 µl of 5 mg/ml MTT in phosphate buffered saline (PBS) without calcium and magnesium ions is then added to each well. The plates are placed in an incubator where MTT converts to the insoluble MTT-formazan crystals by mitochondrial dehydrogenases during about 3.5 hours. The medium is then removed and the obtained formazan crystals are dissolved in 0.2 ml of DMSO. The amount of formazan is quantified in an ELISA-reader at 550 nm. Background values at 650 nm are subtracted. The experiments are performed in triplicate.

Late differentiation processes in HaCat cells treated with ZEP3, ZEP4, or salts thereof are measured by determining the cornified cell envelope formation, according to the procedure described in Sun et al. (Cell 9(4 Pt 1):511-2, 1976). In brief, cells are seeded in 24-well tissue culture plates and after attachment (24 hours) are exposed to ZEP3, ZEP4, or salts thereof. The cells are thereafter detached and re-suspended in medium. Counting of total and basal (small, rounded) cells is performed using hemocytometer in tetraplicate aliquots. The remaining cells are spun down, treated with 10 mM Tris-HCl (pH 7.4) supplemented with 1% µ-mercaptoethanol and 1% SDS for 10 minutes, and cornified envelope cells are counted in tetraplicate aliquots using hemocytometer.

Effects of ZEP3, ZEP4, or salts thereof on early (keratin k10 expression) and late (involucrin expression) differentiation processes in HaCat cells is estimated by indirect immunofluorescence. In brief, $2 \times 10^4$ cells/ml are seeded on glass coverslips into Petri dishes with ZEP3, ZEP4, or salts thereof. After 72 hours of incubation, cells on the glass coverslips are washed with PBS, fixed by ice-cold mixture of methanol:acetone (1:1) and incubated at −20° C. for 10 minutes. Fixed cells are then washed in PBS and incubated with blocking buffer (1% BSA in PBS) for 10 minutes, to minimize non-specific absorption of the primary antibodies to the coverslips. Thereafter, the cells are incubated for 1 hour with primary monoclonal antibodies (Keratin 10 expression is detected by antihuman mouse monoclonal antibody, at 1/50 final dilution; Involucrin expression is detected by antihuman involucrin mouse monoclonal antibody at 1/100 final dilution), at 37° C. in a humidified chamber. Exhaustive, PBS-washed cells are incubated with fluorophor conjugated goat anti-mouse IgG, at 1/50 final dilution, for 30 minutes at room temperature. The slides are viewed under Zeiss microscope (Axioskop-2) equipped with epifluorescence optics and the appropriate filters to avoid cross-channel contamination. The level of keratin 10 and involucrin expression is estimated by counting the positive cells relative to the total cell number. In each slide, at least 500-1000 cells are scored.

Example 5. Protection Against ROS

In order to evaluate the effect of protection of the peptide of the invention against ROS, the following experimental model is used. Primary Normal Human Epidermal Keratinocytes (NHEK) derived from a 20 year old Caucasian male are used. Flow cytometry analysis with mean fluorescence intensity read out provides the percentage of cells with high ROS content. ZEP3, ZEP4, or salts thereof in concentrations of 15, 30 or 60 µg/mL are tested. The cells are incubated with ZEP3, ZEP4, or salts thereof for 24 hours before treatment and 1 hour co-treatment together with the ROS inducer selected from menadione, tert-Butyl hydroperoxide (tBHT), and cumene hydroperoxide (2 concentrations). Vehicle control is used as the negative control and 10 mM N-acetyl cysteine (NAC) is used as the positive control. Each experiment is performed in triplicate.

Example 6. Cell Viability Evaluation after Oxidative Stress Induction

In order to evaluate the viability of cells treated with the peptide of the invention after oxidative stress induction, the following experimental model is used. Primary Normal Human Epidermal Keratinocytes (NHEK) derived from a 20 year old Caucasian male are used. Live cell imaging (one image every 2-4 hours) provides the percentage of cytolyzed cells. ZEP3, ZEP4, or salts thereof in concentrations of 15, 30 or 60 µg/mL are tested. The cells are incubated with ZEP3, ZEP4, or salts thereof for 24 hours before treatment and 24-28 hours co-treatment together with the ROS inducer selected from tert-Butyl hydroperoxide (tBHT), and hydroperoxide (2 concentrations). Vehicle control is used as the negative control and 10 mM N-acetyl cysteine (NAC) is used as the positive control. Each experiment is performed in triplicate.

Example 7. Protection Against Oxidative Stress Induced Senescence

In order to evaluate the effect of protection of the peptide of the invention against oxidative stress induced senescence, the following experimental model is used. Primary Normal Human Epidermal Keratinocytes (NHEK) derived from a 20 year old Caucasian male are used. Senescence is assessed by measuring beta galactosidase levels using flow cytometry. ZEP3, ZEP4, or salts thereof in concentrations of 15, 30 or 60 µg/mL are tested. The cells are incubated with ZEP3, ZEP4, or salts thereof for 24 hours before treatment, 2 hours co-treatment, and 48 hours post treatment with hydroperoxide (200 µM) as the ROS inducer. Vehicle control is used as the negative control and 10 mM N-acetyl cysteine (NAC) is used as the positive control. Each experiment is performed in triplicate.

Example 8. The Efficacy of Compositions Comprising ZEP3, ZEP4 or Salts Thereof in Human Subjects The effect of compositions comprising the peptides of the present invention on human subjects was tested. In particular, cream compositions comprising 1.0% ZEP3, ZEP4, or salts thereof as detailed in Example 1, Table 2 or 0.1-1.0% of ZEP3, ZEP4, or salts thereof supplemented to commercial creams were applied by six individuals who reported positive results as follows:

An 80-years-old female subject who applied the cream every other day for a period of 4 years reported improved appearance of wrinkles.

A 52-years-old female subject who applied the cream daily for a period of 18 months reported improved smoothness of the facial skin with disappearance of wrinkles.

A 70-years-old female subject who applied the cream daily on her face and arms for a period of 4 years reported improvement in skin appearance.

An 80-years-old female subject who applied the cream daily for a period of 1 year reported smoother and softer skin.

A 70-years-old female subject who suffered from dark pigmentation marks on large portions of her body, applied the cream 3-4 times per day and reported disappearance of the skin hyperpigmentation.

A 42-years-old female subject who suffered from folding skin in her chest area applied the cream daily for a period of 2 years and reported a significantly smoother skin in the area that has been treated.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

$X_1$ is selected from the group consisting of Asn and Thr;

$X_2$ is selected from the group consisting of Trp, Phe and Tyr; and $X_3$ is selected from the group consisting of Lys, Lys attached through its amino side chain to a $C_4$-$C_{30}$ alkyl group, and Thr; and a dermatologically acceptable carrier, wherein the epidermal condition related to aging is selected from the group consisting of elastosis, atrophy of the skin, fine lines, wrinkles, enlarged pores, hyperpigmentation, sagging skin, rough skin, and dry skin.

2. The method of claim 1, wherein the peptide of Formula I or a salt or derivative thereof has an amino acid sequence of pGlu-Asn-Trp-Lys (octanoyl)-OH as set forth in SEQ ID NO: 1 or a salt thereof.

3. The method of claim 2, wherein the peptide is the sodium salt of the peptide having an amino acid sequence as set forth in SEQ ID NO: 1.

4. The method of claim 1, wherein the peptide of Formula I or a salt or derivative thereof has an amino acid sequence of pGlu-Asn-Trp-Thr-OH as set forth in SEQ ID NO: 2.

The invention claimed is:

1. A method of treating, minimizing, or diminishing an epidermal condition related to aging in a subject in need thereof, the method comprising administering to the subject a composition comprising as an active ingredient a peptide of Formula I: pGlu-$X_1$—$X_2$—$X_3$—OH or a salt or derivative thereof, wherein:

5. The method of claim 4, wherein the peptide is the sodium salt of the peptide having an amino acid sequence as set forth in SEQ ID NO: 2.

6. The method of claim 1, wherein the composition comprises from about 0.1% to about 5% w/w of the peptide of Formula I or a salt or derivative thereof.

7. The method of claim 1, wherein administration comprises topical administration or intradermal administration.

8. The method of claim 7, wherein the composition is in a form selected from the group consisting of an oil, a gel, a stick, a lotion, a cream, a milk, an aerosol, a spray, a foam, a mousse, an ointment, liquid drops, nebulized liquid, a liquid wash, an emulsion, a suspension, liposomes, an adhesive patch, and a powder.

9. The method of claim 7, wherein the composition is in a form of a gel, an ointment, a cream, an emulsion, or an emulgel.

10. The method of claim 1, wherein the dermatologically acceptable carrier comprises at least one of a thickener, a filler, a moisturizer, an emulsifier, a humectant, a surfactant, a buffering or pH adjusting agent, a film forming agent, a foaming agent, an anti-foaming agent, a preservative, an anti-oxidant, a fragrance, a solvent, a propellant, a colorant, and a combination or mixture thereof.

11. The method of claim 1, wherein treating, minimizing, or diminishing an epidermal condition related to aging in a subject in need thereof comprises at least one of improving the firmness or elasticity of skin, smoothing of fine-lines or wrinkles, reducing skin pores, reducing hyperpigmentation, increasing skin thickness, radiance and/or softness, and reducing dry skin.

\* \* \* \* \*